June 2, 1925.
W. I. THRALL
GAS REGULATOR
Filed May 12, 1924
1,540,439
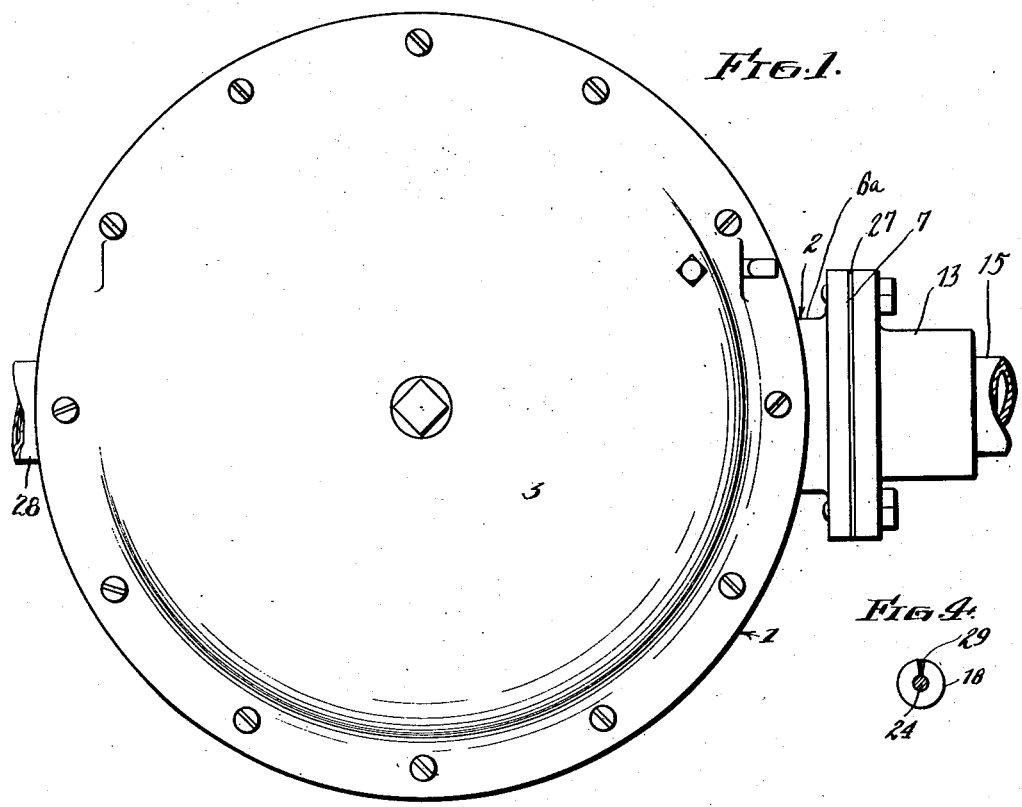
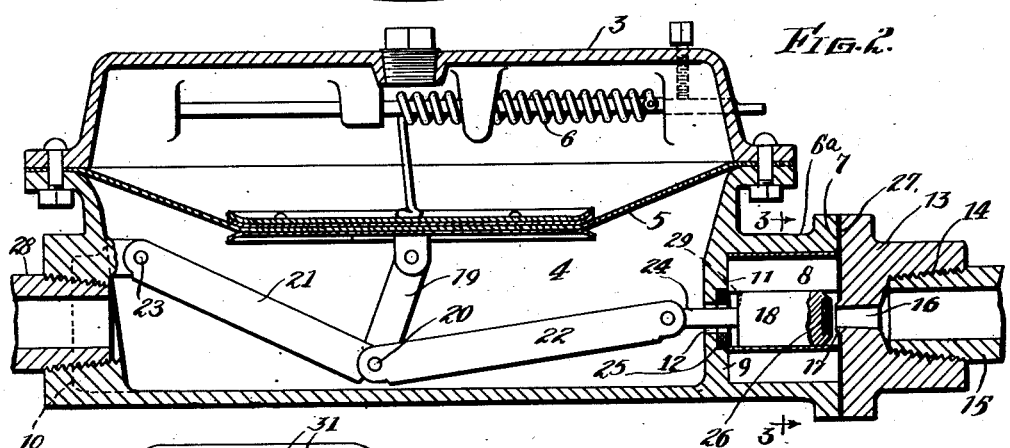
Inventor
Walter I. Thrall
By Lyon & Lyon
Attorneys Patented June 2, 1925.

1,540,439

UNITED STATES PATENT OFFICE.

WALTER I. THRALL, OF PASADENA, CALIFORNIA, ASSIGNOR TO RELIANCE MANUFACTURING COMPANY, OF PASADENA, CALIFORNIA, A CORPORATION OF CALIFORNIA.

GAS REGULATOR.

Application filed May 12, 1924. Serial No. 712,718.

*To all whom it may concern:*

Be it known that I, WALTER I. THRALL, a citizen of the United States, residing at Pasadena, in the county of Los Angeles, State of California, have invented a new and useful Gas Regulator, of which the following is a specification.

This invention relates to gas-regulators such as are employed in connection with a high pressure gas supply for reducing the pressure of the gas before it is used in burners. If the gas service line leading from the regulator should become broken, or if from any other cause the pressure in the regulator drops considerably the regulator valve as usually constructed and controlled would remain open and gas would continue to flow through the regulator. Regulator valves have been constructed with a safety valve so that when the pressure falls as suggested the safety valve closes, shutting off further escape of gas through the regulator. A type of regulator valve including this safety feature is illustrated in patent to Arthur J. Hodge, No. 1,097,322, granted May 19, 1914. In the construction disclosed in that patent, however, the valve operates within a valve body which is screw threaded into the side of the casing. The valve body carries the safety valve seat at one end, and the regulator valve seat at the other end; and hence, if the position of the valve body is adjusted to alter the position of the seat of the regulated valve port, it may produce a faulty adjustment of the safety valve seat which cooperates with the other end of the valve.

The general object of this invention is to produce a gas-regulator of simple construction which will embody a regulator valve with this "safety valve" feature referred to but in which the regulator valve may be readily adjusted without affecting the adjustment of the safety valve; also to provide a construction in which the valve is readily accessible.

A further object of the invention is to provide means whereby the regulator valve will begin to operate in case gas pressure is developed again in the pressure chamber of the regulator after having fallen so low as to permit the closing of the safety valve.

Further objects of the invention will appear hereinafter.

The invention consists in the novel parts and combinations of parts to be described hereinafter, all of which contribute to produce an efficient gas-regulator.

A preferred embodiment of the invention is described in the following specification, while the broad scope of the invention is pointed out in the appended claims.

In the drawings:

Fig. 1 is a plan of a regulator embodying my invention.

Fig. 2 is a vertical section taken through the regulator shown in Fig. 1.

Fig. 3 is a cross section on the line 3—3 of Fig. 2.

Fig. 4 is an elevation of the safety valve end of the valve, the valve stem being shown in cross section.

In practicing my invention I provide a regulator having a casing 1, including a body 2, and a cover 3. Within the body 2 there is formed a pressure chamber 4, one side of which is formed by a flexible diaphragm 5, the edge of which is clamped between the body and the cover. In the cover 3 a coil spring 6 is mounted, one end of which presses against the center of the diaphragm and offers a resistance to the outward movement of the diaphragm under the action of the gas pressure within the pressure chamber.

This diaphragm 5 constitutes a part of the pressure controlled mechanism of the regulator. At one side the casing is provided with a projecting neck $6^a$, the outer end of which forms a flat face 7 constituting a seat on the outer side of the casing; from this seat a bore 8 extends inwardly and operates as a valve chamber, the inner end of the valve chamber being closed by a fixed head 9 which constitutes a portion of the cylindrical wall 10 of the regulator. The face 11, at the inner end of the valve chamber 8, however, is flat so as to operate as a safety valve seat, and through the wall, at this point, there is formed a safety valve port 12. The valve chamber is closed by a cover 13 which is as a distinct part independent of the head 9, and constitutes a pipe fitting, that is to say, it is provided with a threaded socket 14 for attachment of an inlet pipe connection 15. It is further provided with an inlet port 16, and on its inner face the material is raised around the inner edge of the port to form a valve seat 17. In the valve chamber there is mounted a valve 18 in the form of a cylindrical plug, and this plug is controlled or actuated by suitable means controlled by the diaphragm 5. In the present instance a link 19 is attached to the middle of the diaphragm 5 and at its other end is connected to a pin 20 at a toggle between a link 21 and a link 22, the former of which is attached on a fixed pin 23 on the casing diametrically opposite to the valve 18; the link 22 is pivotally attached to a valve stem 24 which passes through a safety valve port 12 and is much smaller than the port so as to form a passage of ample area for the flow of the gas through it. The seat proper for this end of the valve 18 is formed by a disc 25 of permanite which is set in a recess in the wall of the valve chamber. The other end of the valve 18 is provided with a gasket 26 of any suitable material which is set in a recess in the end of the valve and which cooperates with the seat 17.. On the fitting seat 7 and between it and the cover 13, one or more metal gaskets, such as gasket 27, are placed, and the thickness or number of these gaskets determines the position of the seat 17 with respect to the valve. The use of a gasket such as the gasket 27 enables the position of the valve seat 17 with relation to the valve to be very nicely adjusted.

In the operation of this regulator if the pressure in the delivery pipe 28, which leads from the regulator, should drop considerably and to such an extent as to reduce the gas pressure in the pressure chamber 4 to a sufficient degree, the diaphragm 5 will move down to its extreme low position and this will bring the end of the valve 18 against the seat 25 of the safety valve port 12, which will close off the flow of the gas from the inlet pipe 15. Such a reduction in pressure may occur in the regulator due to a break in the delivery pipe or may occur by reason of a disconnection of the pipe line by a pipe-fitter making repairs in the delivery line.

I provide means which will operate under these circumstances to reopen the safety valve after the repair in the delivery line 28 has been made, so that the valve 18 will commence to function again as a regulator valve and as a safety valve. In order to accomplish this I provide a small notch or recess 29 on the inner end face of the valve 18 (see Fig. 4). This passage may be made with a file and operates to produce a "bleeder" or leaking point for the gas to permit it to go past the valve 18 into the pressure chamber 4. In this way after sufficient time the pressure in the pressure chamber 4 will build up, due to the accumulation of gas in the regulator and in the delivery line 28, and this pressure will return the diaphragm 5 to its normal operating position. After this occurs the valve 18 will commence to function again in its regular way.

Any suitable means may be provided for guiding the valve 18 in the valve chamber. For this purpose I may provide a cage 30 which may be formed of sheet metal plate bent into star form and presenting a plurality of points 31 which engage the wall of the valve chamber, and a plurality of inner points 32 which engage the side of the valve and guide the same. This cage, of course, interferes in no way with the passage of the gas around and along the valve 18 and through the port 12 into the interior of the regulator.

It is understood that the embodiment of the invention described herein is only one of the many embodiments this invention may take, and I do not wish to be limited in the practice of the invention, nor in the claims, to the particular embodiment set forth.

What I claim is:

1. In a gas-regulator, the combination of a casing having a pressure chamber for the gas, said casing having a face on its outer side constituting a seat with a valve chamber formed in said seat, a valve with means for guiding the same in said valve chamber, said casing having a fixed transverse wall at the inner end of the valve chamber with a port therethrough opening communication from the valve chamber to the pressure chamber, and having a valve seat at said port, a cover constituting a distinct part independent of said transverse wall attached to the said fitting seat, having an inlet port for the gas with a seat on the inner side thereof and cooperating with the outer end of the valve, and pressure controlled mechanism within the casing connected with the valve for actuating it.

2. In a gas-regulator, the combination of a casing having a pressure chamber for the gas, said casing having a face on its outer side constituting a fitting-seat with a valve-chamber formed in said seat, a valve with means for guiding the same in said valve-chamber, said casing having a fixed transverse wall with a safety valve seat at the inner end of said valve-chamber and having a port therethrough communicating with the gas outlet from the casing, pressure controlled mechanism within the casing connected with the valve for actuating it and a fitting secured on said fitting-seat constituting a distinct part independent of said fixed transverse wall, having means for admitting the high pressure gas with an inlet port and a valve seat cooperating with the outer end of the valve to regulate the pressure.

3. In a gas-regulator, the combination of a casing having a pressure chamber for the gas, said casing having a face on its outer side constituting a fitting seat with a valve-chamber formed in said seat, a valve with means for guiding the same in said chamber, a safety valve seat at the inner end of said valve-chamber and having a port therethrough communicating with the pressure chamber, pressure controlled mechanism within the casing having a stem carrying the valve and passing through said port, and a fitting constituting a distinct part independent of said safety valve seat secured on the said fitting-seat having means for admitting the high pressure gas with an inlet port and seat cooperating with the outer end of the valve to regulate the pressure.

Signed at Pasadena this 6th day of May, 1924.

WALTER I. THRALL.